July 26, 1960
K. E. CANTREL
2,946,717
INSECT REPELLENT COMPOSITION AND METHOD
FOR REPELLING INSECTS
Filed Aug. 21, 1958
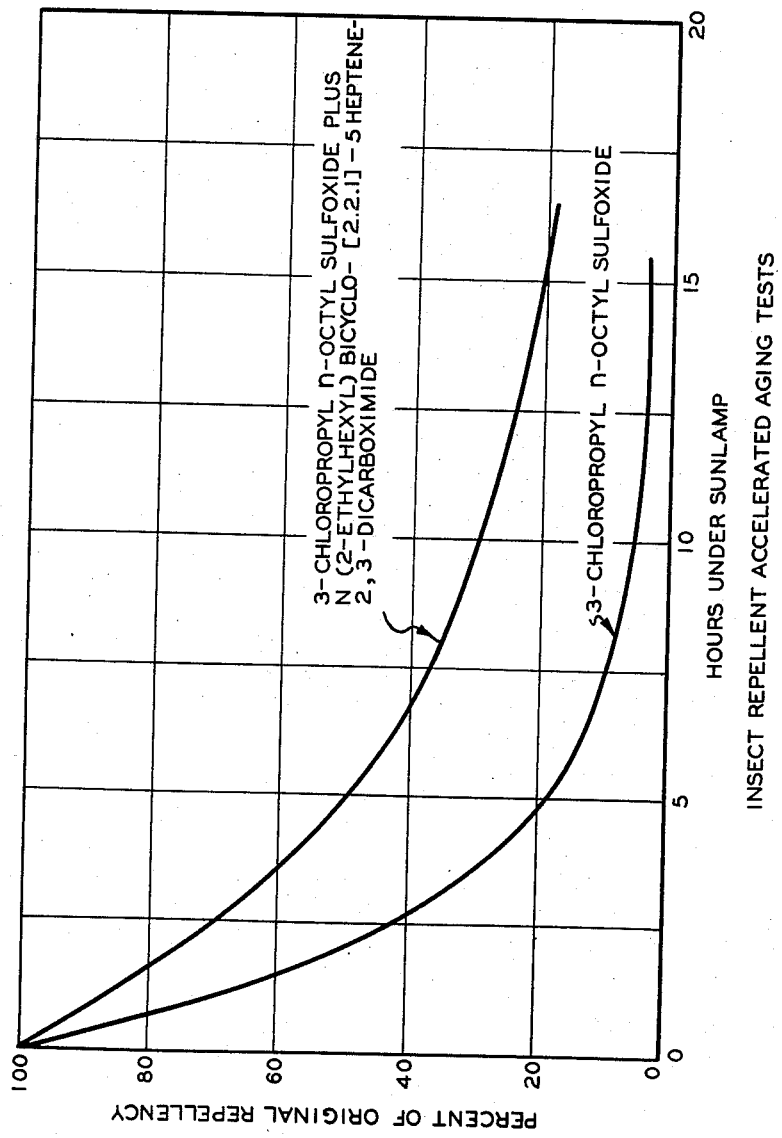
INVENTOR.
K.E. CANTREL
BY Hudson & Young
ATTORNEYS

United States Patent Office 2,946,717
Patented July 26, 1960

2,946,717
INSECT REPELLENT COMPOSITION AND METHOD FOR REPELLING INSECTS

Kenneth E. Cantrel, Bartlesville, Okla., assignor to Phillips Petroleum Company, a corporation of Delaware Filed Aug. 21, 1958, Ser. No. 756,423

25 Claims. (Cl. 167—22)

This invention relates to the repelling of insects. In one aspect, this invention relates to an improved insect repellent composition. In another aspect, this invention relates to a method for repelling insects from a chosen area or space. In another aspect, this invention relates to an area or space rendered insect repellent by the presence thereon of an improved insect repellent composition described herein. In another aspect, this invention relates to a method for enhancing the repellency of a known insect repellent.

Selected sulfoxide compounds, more particularly 3-chloropropyl-n octyl sulfoxide, 3-chloropropyl sec-octyl sulfoxide, 3-chloropropyl tert-octyl sulfoxide, 2-methyl-3-chloropropyl n-octyl sulfoxide, 2-methyl-3-chloropropyl sec-octyl sulfoxide, and 2-methyl-3-chloropropyl tert-octyl sulfoxide, are known to be effective as agents for repelling insects, particularly house flies and stable flies, from surfaces frequented by the insects when the compounds are applied to such surfaces, as set forth, described and claimed in application Serial No. 733,834, of Roy E. Stansbury and Rector P. Louthan, filed May 8, 1958.

It has now been discovered that the repellency of one of these sulfoxides, 3-chloropropyl n-octyl sulfoxide, can be enhanced by incorporating therewith a N-alkyl imide of bicyclo[2.2.1]-5-heptene-2,3-dicarboxylic acid.

An object of this invention is to provide an improved 3-chloropropyl n-octyl sulfoxide insect repellent composition having enhanced repellency properties. Another object of this invention is to provide a method for enhancing the repellency of a 3-chloropropyl n-octyl sulfoxide insect repellent by increasing is repellency effectiveness. Another object of this invention is to provide a method for enhancing the repellency of a 3-chloropropyl n-octyl sulfoxide insect repellent composition by increasing its repellency life. Another object of this invention is to provide a method for repelling insects from localities frequented by them. Another object of this invention is to provide an area or space free of insect habitation.

Other aspects, objects and several advantages of the invention are apparent from a study of this disclosure, the drawing and the appended claims.

In accordance with the invention, a 3-chloropropyl n-octyl sulfoxide insect repellent composition having a N-alkyl imide of bicyclo[2.2.1]-5-heptene-2,3-dicarboxylic acid associated therewith to enhance the repellency properties of said 3-chloropropyl n-octyl sulfoxide has been provided.

In accordance with another concept of this invention, there is provided a method for repelling insects from area surfaces and confined spaces by applying to said surface or said confined space a 3-chloropropyl n-octyl sulfoxide insect repellent composition containing an insect repellent enhancing proportion of a N-alkyl imide of bicyclo[2.2.1]-5-heptene-2,3-dicarboxylic acid.

In accordance with another concept of this invention, there is provided area surfaces or confined spaces which are insect repellent and which contain a 3-chloropropyl n-octyl sulfoxide insect repellent composition having associated therewith a N-alkyl imide of bicyclo [2.2.1]-5-heptene-2,3-dicarboxylic acid.

In accordance with another concept of this invention, there is provided a method for enhancing the repellency of 3-chloropropyl n-octyl sulfoxide insect repellent composition by incorporating therewith an insect repellent enhancing proportion of a N-alkyl imide of bicyclo[2.2.1]-5-heptene-2,3-dicarboxylic acid.

The repellency of the 3-chloropropyl n-octyl sulfoxide insect repellent composition is enhanced in at least two ways. First, the enhancing component increases the effectiveness of the repellent composition in a manner commonly termed "synergism" whereby fewer insects approach the area or space containing a synergistic proportion of the enhancing component. Second, the repellency life of the repellent composition is increased in a manner commonly termed "stabilization" whereby the enhanced repellent composition containing a stabilizing proportion of enhancing component retains the property of repelling insects for a longer period of time.

Therefore, according to the invention and as a specific feature thereof, there is provided a method for increasing the repellency effectiveness of a 3-chloropropyl n-octyl sulfoxide insect repellent composition by incorporating therewith a synergistic proportion of a N-alkyl imide of bicyclo[2.2.1]-5-heptene-2,3-dicarboxylic acid.

Also, according to the invention and as a specific feature thereof, there is provided a method for increasing the repellency life of a 3-chloropropyl n-octyl sulfoxide insect repellent composition by incorporating therewith a stabilizing proportion of a N-alkyl imide of bicyclo[2.2.1]-5-heptene-2,3- dicarboxylic acid.

The N-alkyl imides of bicyclo[2.2.1]-5-heptene-2,3-dicarboxylic acid can be represented by the formula

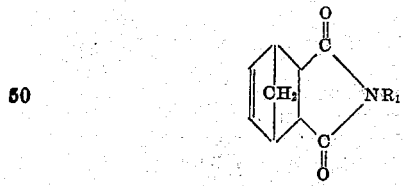

wherein $R_1$ is an alkyl radical containing not more than 12 carbon atoms.

Representative examples of the N-alkyl imides of bicyclo[2.2.1]-5-heptene-2,3-dicarboxylic acid include N-methyl bicyclo[2.2.1]-5-heptene-2,3-dicarboximide; N-ethyl bicyclo[2.2.1]-5-heptene-2,3-dicarboximide; N-isopropyl bicycle[2.2.1]-5-heptene- 2,3-dicarboximide; N-(2-ethylhexyl) bicyclo[2.2.1]-5-heptene-2,3-dicarboximide;

N-t-dodecyl bicyclo[2.2.1]-5-heptene-2,3-dicarboximide; N-isoheptyl bicyclo[2.2.1]-5-heptene-2,3-dicarboximide; N-tert-butyl bicyclo[2.2.1]-5-heptene-2,3-dicarboximide; N-(3-propyloctyl) bicyclo[2.2.1]-5-heptene-2,3-dicarboximide; and N-(2,3-dimethyldecyl) bicyclo[2.2.1]-5-heptene-2,3-dicarboximide. N-(2-ethylhexyl) bicyclo [2.2.1]-5-heptene-2,3-dicarboximide is the preferred enhancing compound of this type.

The N-alkyl imides of bicyclo [2.2.1]-5-heptene-2,3-dicarboxylic acid can be prepared by condensing cyclopentadiene with maleic anhydride dissolved in benzene at ordinary room temperature. The resulting condensation product is then reacted with the appropriate alkyl amine to produce the desired product. Thus, the condensation product of cyclopentadiene and maleic anhydride is reacted with tert-butyl amine to produce N-tert-butyl bicyclo[2.2.1]-5-heptene-2,3-dicarboxylic acid.

The proportions in which the enhancing compound can be mixed with the 3-chloropropyl n-octyl sulfoxide repellent composition varies over a wide range. It appears that an extent of repellency enhancement will exist with the presence of as little as one percent by weight of the enhancing compound in the admixture. Usually, the enhancing compound is present in the admixture in an amount equivalent to from 5 to about 95 weight percent of the total admixture. Thus, the proportion by weight of the N-alkyl imide of bicyclo[2.2.1]-5-heptene-2,3-dicarboxylic acid to the 3-chloropropyl n-octyl sulfoxide will usually be in the range of from 5:95 to 95:5. Preferably, an amount of the N-alkyl imide of bicyclo[2.2.1]-5-heptene-2,3-dicarboxylic acid, amounting to from 25 to 75 percent by weight of the total admixture is used.

The improved repellent composition of this invention can be applied for its intended purpose as either the pure compound or in combination with a diluent or carrier adjuvant. Preferably, the repellent compositions of this invention are applied from an aerosol bomb, in which case the diluent preferably comprises two components although a single component diluent can be used. When a two component diluent is used, the first component is a material which will cause discrete droplets to be formed as the material is sprayed and the second component is utilized to provide sufficient vapor pressure to force the repellent material from the bomb container when the valve is opened. These diluents can be any diluent materials having suitable solubility and low pressure characteristics. For example, ethyl alcohol, isopropyl alcohol, methylene chloride and Freon 11 can be used as diluents of the first type and n-butane and Freon 12 can be used as diluents of the second type.

The repellent compositions of this invention can also be applied as solutions which are sprayed, brushed or wiped on the surface from which insects are to be repelled. For this method of application, the repellent materials are admixed with a diluent such as, for example, a naphtha, kerosene, toluene, xylene, cyclohexanone, acetone or a mixture of high boiling isoparaffinic hydrocarbons. The preferred isoparaffinic hydrocarbon fraction has a boiling point in the range of 260 to 800° F. and is commonly known as Soltrol (trademark). If desired, an odorant, including perfume, can be incorporated in the formulation.

The repellent compositions of this invention can also be applied in the form of an aqueous emulsion. If desired, the active ingredients can be emulsified directly with water or be first dissolved in a substantially water insoluble solvent, such as one of the aforementioned solvents, and the resulting solution emulsified with water. Any suitable emulsifying or wetting agents can be employed, such as, for example, Span 20 (sorbitan monolaurate), Tween 20 (sorbitan monolaurate polyoxyethylene derivative), Triton X-100 (akylated aryl polyether alcohol), and the like.

The repellent compositions of this invention can also be utilized for their intended purpose in the solid state as dust, preferably in admixture with a solid carrier substantially inert to the active repellent ingredients. Solid inert carriers, especially suitable, include kieselguhr and other inert finely divided solid materials.

The improved insect repellent compositions of this invention are effective when employed in very small amounts. Thus, when applied in the usual manner over an area or volume, an amount as small as about 0.05 percent by weight of the overall composition is found to be effective. Ordinarily, the formulation will not contain an amount greater than about 50 percent by weight of the composition. Nevertheless, even lower or higher concentrations can be used.

When applying the repellent compositions of this invention to a surface area to repel insects, such as flies, the method of application is adjusted, as will be understood by one skilled in the art in possession of this disclosure, through deposit of approximately 0.01 to 20 grams of the active ingredient on each 100 square feet of surface. Application of the repellent compositions of this invention by spraying, as with an aerosol bomb, into space, will be adjusted to suspend approximately 0.001 to 5 grams of active ingredients in each 100 cubic foot of volume. Larger or smaller amounts can be applied, as desired, although it is generally neither economical to employ larger amounts, nor efficient, because of lack of repellency action, to employ smaller amounts.

The enhancing agents of this invention are effective in enhancing the repellency of 3-chloropropyl n-octyl sulfoxide insect repellent compositions when an appreciable quantity of any one or more of the N-alkyl imides of dicyclo [2.2.1]-5-heptene-2,3-dichrboxylic acid is incorporated in the admixture.

The improved repellent composition of this invention can be employed to repel many different species of insects with equal effectiveness, such as houseflies, stableflies, ticks, fleas, gnats, roaches, mosquitoes, and the like. The improved repellent compositions of this invention are particularly effective in repelling houseflies (*Musca domestica*) and of stableflies (*Stomoxys calcitrans*).

In the drawing, the effectiveness of the enhancing agents of this invention in increasing the repellency life of 3-chloropropyl-n-octyl sulfoxide repellent compositions is shown graphically. Further reference will be made to the drawing in discussion of the examples which also illustrate the invention and which follow:

EXAMPLE I

Repellent compositions containing varying amounts of 3-chloropropyl-n-octyl sulfoxide and N-2-(ethylhexyl) bicyclo-[2.2.1]-5-heptene-2,3-dicarboximide were tested for repellency toward stableflies to show synergism. Organdy bags fabricated from a sheet of organdy 10 inches square so that one end of the bag is open were impregnated with the desired amount of the repellent composition to be tested dissolved in 6 to 7 milliliters of acetone and were then suspended on a line in the atmosphere to dry. After twenty-four hours, the bags were drawn over the hand and exposed to several thousand stableflies confined in thirty-inch cubical cages. The flies were reared according to the method reported by Campau, Baker and Morrison in "Journal of Economic Entomology," 46, 524 (1953). The time to the first bite was recorded, and if no bites were sustained in five minutes, the bag was withdrawn and the procedure repeated the following day. If a bite was received, the flies were shaken off the bag and the bag was kept in the cage until either no bites were received in a five minute period or until two additional bites were received, in which case the time in seconds to each of the second and third bites was recorded. The period of effective repellency was recorded as the number of days from the day the bags were impregnated to the day when the flies bit constantly. Random bites were not considered to show the loss of effective repellency. The results of these tests are expressed below in the table.

Table

ORGANDY BAG TESTS WITH STABLE FLIES USING 3-CHLOROPROPYL-N-OCTYL SULFOXIDE, N(2-ETHYLHEXYL) BICYCLO-[2.2.1]-5-HEPTENE-2, 3-DICARBOXIMIDE, AND MIXTURES OF THESE TWO COMPOUNDS

| Test No. | Amount Used to Treat Bag, gms. | | Seconds To Bite Nos. 1, 2 and 3 When Tested At Various Times After Treatment of Bag [1] | | | | | | | |
|---|---|---|---|---|---|---|---|---|---|---|
| | Dicar-boximide | Sulfoxide | 1 Day | 2 Days | 3 Days | 4 Days | 5 Days | 6 Days | 7 Days | 8 Days |
| 1 | 2 | 0 | 50, 15, 10 | | | | | | | |
| 2 | 0.9 | 0.1 | N | 60, 60, 30 | | | | | | |
| 3 | 0.75 | 0.25 | N | N | 45, 20, N | | | | | |
| 4 | 0.5 | 0.5 | N | N | N | N | 80, 50, N | 65, 180, N | 200, N | 60, 30, 30 |
| 5 | 0.1 | 0.9 | N | N | N | 180, 63, N | 17, 8, 60 | | | |
| 6 | 0 | 1.0 | 150, 200, N | 185, 170, 25 | | | | | | |

[1] N in the table indicates no bites within the 5-minute exposure period.

As shown in the table, the dicarboximide alone, even though used in amounts of 2 grams, did not impart complete repellency since bites were received after 50, 15 and 10 seconds when tested at the end of the first day. Since bites were obtained on all three trials, this test was not continued. The sulfoxide alone had a good repellency at the end of the first test period, as shown by test 6, but bites were obtained on all three trials on the second day. Tests 2, 3 and 4 show that mixtures of the dicarboximide and the sulfoxide in a total amount equal to the 1 gram of sulfoxide used separately are more repellent than either the sulfoxide or the dicarboximide alone. Thus, the mixtures of dicarboximide and the sulfoxide show an increase in repellency effectiveness when compared to either the sulfoxide or the dicarboximide alone.

EXAMPLE II

The increase in repellency life obtained by admixing the dicarboximide with the 3-chloropropyl-n-octyl sulfoxide insect repellent was tested by exposure of sandwich-bait samples containing sulfoxide alone and the sulfoxide in admixture with the dicarboximide to an ultra-violet lamp in a humid atmosphere and then determining the repellency of the exposed samples by the sandwich-bait method.

In the sandwich-bait method described by L. B. Kilgore in "Soap," June 1939, two strips of molasses, each about ¼ inch wide were painted on a stiff card of four inch x six inch dimensions. Each strip of molasses extended to within about ¼ inch of the ends, and each was located about ¼ inch from either side. The cards were then placed in an oven and maintained at a temperature of 212° F. for four hours. Strips of highly porous lens paper, 1 inch x 5 inches in dimension, were then dipped in a 1 percent weight solution in acetone of the composition to be tested, and then allowed to dry over a period of two to three hours. These strips containing the repellent composition were then super-imposed on molasses strips and fashioned in place by stapling.

The prepared strips, i.e., the sandwich-bait, were then placed in cages containing houseflies, over 5 days old which had been starved for six hours. The highly porous paper strip containing the impregnated composition to be tested was thus exposed to the flies and the loose fibered structure of the impregnated paper permitted the flies to remove molasses through it. A molasses bait covered with a strip of lens paper impregnated with a nonrepellent material became black with flies soon after being exposed and the bait was consumed in five minutes. In conducting these tests, counts of the number of flies feeding on the strip were taken periodically over a period of two hours and forty-five minutes.

Accelerated aging of candidate compositions for the purpose of determining repellency life was accomplished by exposure of the candidate composition to an ultra-violet lamp (General Electric Sun Lamp S-1) in a humid atmosphere. The lamp was suspended in a shade above a phonograph turntable (33 r.p.m.) on which was mounted an aluminum dishpan. Two large cellulose sponges were placed in the dish pan and covered with four mesh hardware cloth. The sponges were kept wet by excess water in the pan. Clean filter paper was placed on the hardware cloth and the strips of repellent-impregnated lens paper were pinned in place. The distance from the test strips to the light, 9 inches, was adjusted to maintain a temperature of about 100° F. The strips were exposed to the light for various periods of time.

Test strips impregnated with either a solution containing 0.2 percent by weight of the sulfoxide and 0.2 percent by weight of the dicarboximide or a solution containing 0.2 percent by weight of the sulfoxide alone were prepared. A portion of the strips were exposed to the ultra-violet lamp and the repellency of these exposed strips, as well as the unexposed strips, was then determined by the sandwich-bait method. The percent of original repellency remaining after exposure to the ultra-violet lamp was estimated by comparing the repellency of the exposed strips with strips having various concentrations of the candidate composition not exposed to the sun lamp, assuming that strips impregnated with 0.4 weight percent of the composition had 100 percent repellency. In this manner, it was possible to estimate within the range of about ±10 percent the effectiveness of the strips exposed to the sun lamp as compared with the effectiveness of the unexposed strips, as shown graphically in accompanying drawing where the percent of original repellency is plotted against hours under the sun lamp.

The curves shown in accompanying drawing demonstrate that the activity of the sulfoxide repellent can be considerably increased by its use in admixture with the dicarboximide. For example, the repellency of strips treated with sulfoxide alone was reduced to about 20 percent of the original repellency by a five-hour exposure period. In comparison, the repellency of the strips impregnated with a mixture of the sulfoxide and the dicarboximide was reduced to only about 50 percent of the original repellency after exposure for the same period of time.

EXAMPLE III

In this example, the effectiveness of an emulsifiable concentrate for spraying dairy animals is demonstrated. The emulsifiable concentrate had the following compositions:

| Ingredient | Percent by Weight in Concentrate |
|---|---|
| 3-chloropropyl n-octyl sulfoxide | 10 |
| N-(2-ethylhexyl) bicyclo-[2.2.1]-5-heptene-2,3-dicarboximide | 40 |
| Triton X-100 | 7.45 |
| Xylene | 42.5 |

One part of this concentrate was mixed with 19 parts of water prior to application by spraying. One group of six cows was selected as the control group and a second group was sprayed with 4 ounces per cow of the water emulsion each day. The cows were sprayed during the milking time between 1:00 and 2:30 p.m. each day, with a pressurized sprayer which permitted good coverage of each animal with a fine spray. Each cow was sprayed Monday through Friday for a total of five applications each week. The number of stable and horn flies on each cow was counted at 9, 10 and 11 a.m. and at 3 and 4 p.m. on Mondays through Fridays and at only 9, 10 and 11 a.m. on Saturdays. The average number of flies per cow was calculated from the observations made over the two-week period. The group of six cows sprayed with the emulsion for the first week served as the control for the second week, and conversely, the group of cows which served as the control for the first week were sprayed with the emulsion during the second week. The results of the test demonstrated that the spraying of the cows with an emulsion containing the sulfoxide-dicarboximide admixture was very effective in decreasing the number of stable flies and horn flies on each cow. The average of the daily counts on the control group and on the sprayed group is as follows:

|  | Average Number of Flies | |
|---|---|---|
|  | Stable Flies | Horn Flies |
| Control Group | 1.97 | 27.24 |
| Sprayed Group | 0.16 | 3.94 |

EXAMPLE IV

The repellency of a mixture of the dicarboximide with the 3-chloropropyl n-octyl sulfoxide with respect to ticks is shown in this example.

A piece of filter paper nine centimeters (3.55 in.) in diameter is divided into four quadrants by drawing pencil lines through the center of the paper. One milliliter of a 1 percent by weight solution in acetone of the chemical to be tested is applied evenly to each of two opposite quadrants, while the remaining two quadrants are left untreated. The solution is applied carefully with a pipet, taking care not to allow the solution to encroach upon the adjacent quadrants. The acetone is allowed to evaporate and the filter paper is then placed in a Petri dish. The dose of one milliliter of a 1 percent solution of these chemicals on a quadrant is calculated to be equivalent to about 47 grams per 100 square feet. From 30 to 60 lonestar ticks of the larval stage (*Amblyomma americanum*) are then placed on paper. At various time intervals the number of ticks on the treated quadrants and the number of ticks in the untreated quadrants are counted. The repellency of the material is then expressed by the following equation:

$$\frac{\text{Number of ticks on untreated quadrants (100)}}{\text{Total number of ticks on the paper}} = \text{Repellency index}$$

Thus, if no ticks are on the treated quadrants, the repellency is 100 by the repellency index. If the number of ticks on the treated and untreated quadrants is equal, the repellency index is 50, and the actual repellency is 0. In the same manner, if the repellency index is less than 50, the chemical is actually an attractant for ticks.

When the filter paper is treated with an acetone solution containing 0.5 percent by weight of 3-chloropropyl n-octyl sulfoxide and 0.5 weight percent N-(2-ethylhexyl)bicyclo-[2.2.1]-5-heptene-2,3-dicarboximide and used in the test described above, the repellency is 80 percent and higher for a period as long as 80 days.

Reasonable variation and modification are possible within the scope of the foregoing disclosure, the drawing, and the appended claims to the invention, the essence of which is improved insect repellents containing 3-chloropropyl n-octyl sulfoxide in admixture with an N-alkyl imide of bicyclo-[2.2.1]-5-heptene-2,3-dicarboxylic acid, as above described, as essential active ingredients; a method employing such improved repellent materials to render a surface area or a space insect repellent; areas or spaces rendered insect repellent by virtue of deposition thereon of a repellent material above described; and a method for enhancing the repellency of 3-chloropropyl n-octyl sulfoxide insect repellents by incorporating therewith an insect repellent enhancing proportion of a N-alkyl imide of bicyclo-[2.2.1]-5-heptene-2,3-dicarboxylic acid.

I claim:

1. An improved insect repellent having enhanced repellency comprising 3-chloropropyl-n-octyl sulfoxide incorporated with a N-alkyl imide of bicyclo-[2.2.1]-5-heptene-2,3-dicarboxylic acid wherein the alkyl substituent of said imide has 1 to 12 carbon atoms.

2. An improved insect repellant composition having enhanced repellency comprising 3-chloropropyl-n-octyl sulfoxide having an insect repellent enhancing proportion of a N-alkyl imide of bicyclo[2.2.1]-5-heptene-2,3-dicarboxylic acid incorporated therewith wherein the alkyl substituent of said imide has 1 to 12 carbon atoms.

3. The improved insect repellent composition of claim 3 wherein said imide of bicyclo[2.2.1]-5-heptene-2,3-dicarboxylic acid is N-(2-ethylhexyl)bicyclo[2.2.1]-5-heptene-2,3-dicarboximide.

4. The improved insect repellent composition of claim 3 wherein said insect repellent enhancing proportion of the N-alkyl imide of bicyclo[2.2.1]-5-heptene-2,3-dicarboxylic acid comprises from 5 to 95 percent by weight of the total composition.

5. An improved insect repellent composition having enhanced repellency comprising 3-chloropropyl-n-octyl sulfoxide having an insect repellent enhancing proportion of an N-alkyl imide of bicyclo[2.2.1]-5-heptene-2,3-dicarboxylic acid incorporated therewith dispersed in a carrier adjuvant wherein the alkyl substituent of said imide has 1 to 12 carbon atoms.

6. A composition according to claim 5 wherein said carrier adjuvant is selected from the group consisting of naphtha, kerosene, toluene, xylene, cyclohexanone, acetone, and a high-boiling isoparaffinic hydrocarbon fraction.

7. A method for repelling an insect from an area comprising applying an insect repellent amount of the improved repellent composition of claim 2 to said area.

8. The method for repelling an insect from an area comprising applying an insect repellent amount of the improved repellent composition of claim 5.

9. The method of claim 8 wherein said repellent composition is applied as an aerosol.

10. The method of claim 9 wherein said repellent composition is applied as liquid solution.

11. The method of claim 9 wherein said repellent composition is applied as a wettable powder.

12. The method of repelling an insect from an area comprising applying a composition of claim 4 to said area so as to deposit from about 0.01 to 20 grams of said composition on each 100 square feet of said area.

13. An area surface repellent to insects having deposited thereon the composition of claim 1.

14. The improved insect repellent composition of claim 2 wherein said imide of bicyclo[2.2.1]-5-heptene-2,3-dicarboxylic acid is N-methyl bicyclo[2.2.1]-5-heptene-2,3-dicarboximide.

15. The improved insect repellent composition of claim 2 wherein said imide of bicyclo[2.2.1]-5-heptene-2,3-dicarboxylic acid is N-ethyl bicyclo[2.2.1]-5-heptene-2,3-dicarboximide.

16. The improved insect repellent composition of claim 2 wherein said imide of bicyclo[2.2.1]-5-heptene-2,3-dicarboxylic acid is N-isopropyl bicyclo[2.2.1]-5-heptene-2,3-dicarboximide.

17. The improved insect repellent composition of claim 2 wherein said imide of bicyclo[2.2.1]-5-heptene-2,3-dicarboxylic acid is N-tert-dodecyl bicyclo[2.2.1]-5-heptene-2,3-dicarboximide.

18. The improved insect repellent composition of claim 2 wherein said imide of bicyclo[2.2.1]-5-heptene-2,3-dicarboxylic acid is N-isoheptyl bicyclo[2.2.1]-5-heptene-2,3-dicarboximide.

19. The improved insect repellent composition of claim 2 wherein said imide of bicyclo[2.2.1]-5-heptene-2,3-dicarboxylic acid is N-tert-butyl bicyclo[2.2.1]-5-heptene-2,3-dicarboximide.

20. The improved insect repellent composition of claim 2 wherein said imide of bicyclo[2.2.1]-5-heptene-2,3-dicarboxylic acid is N-(3-propyloctyl) bicyclo[2.2.1]-5-heptene-2,3-dicarboximide.

21. The improved insect repellent composition of claim 2 wherein said imide of bicyclo[2.2.1]-5-heptene-2,3-dicarboxylic acid is N-(2,3-dimethyldecyl) bicyclo[2.2.1]-5-heptene-2,3-dicarboximide.

22. The improved insect repellent according to claim 1 wherein the proportion of said N-alkyl imide of bicyclo-[2.2.1]-5-heptene-2,3-dicarboxylic acid in said repellent is a synergistic proportion.

23. The improved insect repellent according to claim 1 wherein the proportion of said N-alkyl imide of bicyclo-[2.2.1]-5-heptene-2,3-dicarboxylic acid in said repellent is at least one weight percent.

24. The improved insect repellent according to claim 1 wherein the proportion of said N-alkyl imide of bicyclo-[2.2.1]-5-heptene-2,3-dicarboxylic acid in said repellent is a stabilizing proportion.

25. The improved insect repellent according to claim 1 wherein the weight ratio of said N-alkyl imide of bicyclo[2.2.1]-5-heptene-2,3-dicarboxylic acid to said 3-chloropropyl n-octyl sulfoxide is in the range of 5:95 to 95:5.

References Cited in the file of this patent

UNITED STATES PATENTS 2,824,822    Goodhue  ---------------  Feb. 25, 1958

OTHER REFERENCES

Roark: A List of Organic Sulphur Compounds Used as Insecticides, Bull. E-344, May 1935, p. 34.

Frear: A Catalogue of Insecticides and Fungicides, Chronica Botanica Co., 1947, vol. 1, p. 58.

UNITED STATES PATENT OFFICE

CERTIFICATE OF CORRECTION

Patent No. 2,946,717                                July 26, 1960

Kenneth E. Cantrel

It is hereby certified that error appears in the printed specification of the above numbered patent requiring correction and that the said Letters Patent should read as corrected below.

Column 8, line 21, claim 3, and line 25, claim 4, for the claim reference numeral "3", each occurrence, read -- 2 --; line 43, claim 7, for the claim reference numeral "2" read -- 1 --; same column 8, line 49, claim 10 and line 51, claim 11, for the claim reference numeral "9", each occurrence, read -- 8 --.

Signed and sealed this 31st day of January 1961.

(SEAL)
Attest:

KARL H. AXLINE                                            ROBERT C. WATSON
Attesting Officer                                          Commissioner of Patents